No. 783,308. PATENTED FEB. 21, 1905.
W. S. PLUMMER.
VEHICLE WHEEL.
APPLICATION FILED AUG. 22, 1904.

Witnesses
Alfred A. Eicks
Edw. M. Hennington

Inventor
William S. Plummer
by Higdon & Longan & Hopkins Attys.

No. 783,308.  
Patented February 21, 1905.

UNITED STATES PATENT OFFICE.

WILLIAM S. PLUMMER, OF ST. LOUIS, MISSOURI.

VEHICLE-WHEEL.

SPECIFICATION forming part of Letters Patent No. 783,308, dated February 21, 1905.

Application filed August 22, 1904. Serial No. 221,659.

*To all whom it may concern:*

Be it known that I, WILLIAM S. PLUMMER, a citizen of the United States, and a resident of St. Louis, Missouri, have invented certain new and useful Improvements in Vehicle-Wheels, of which the following is a specification containing a full, clear, and exact description, reference being had to the accompanying drawings, forming a part hereof.

My invention relates to improvements in vehicle-wheels; and it consists of the novel features herein shown, described, and claimed.

Figure 1:
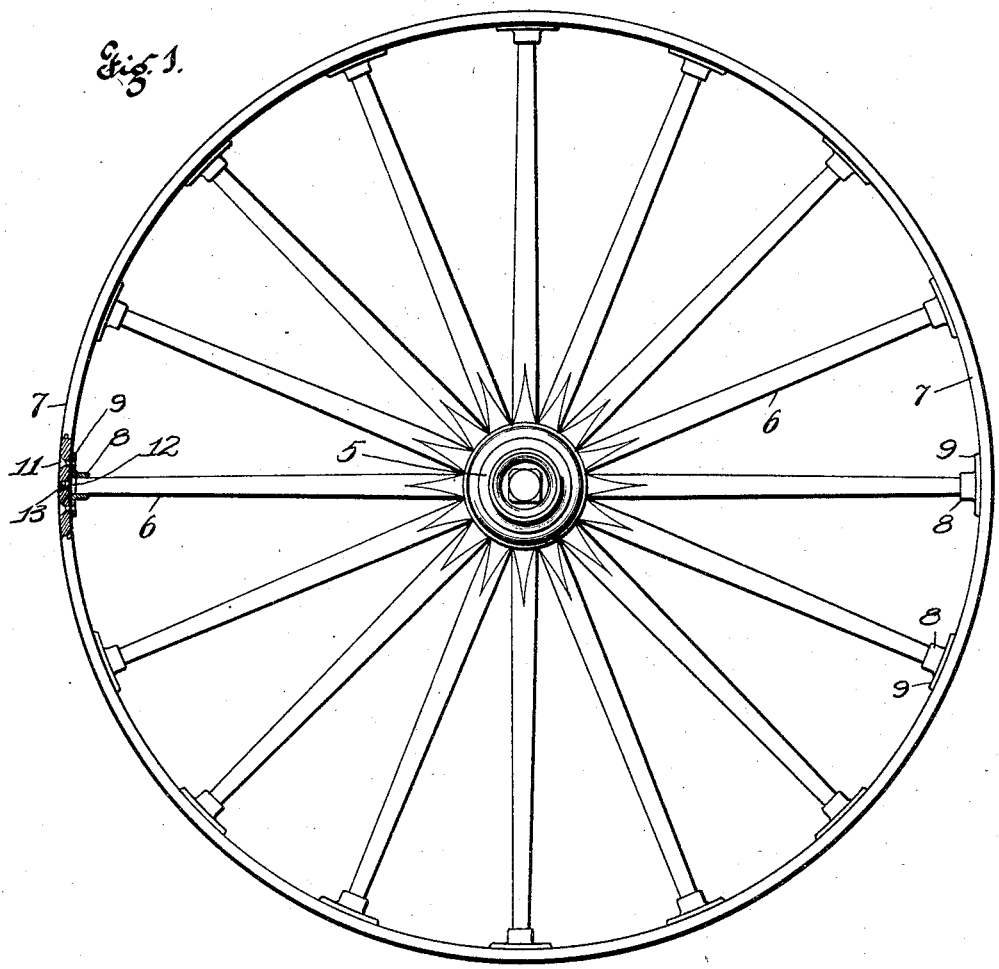
Figure 2:
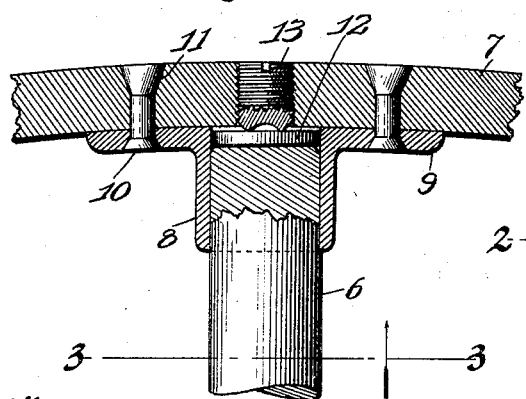
Figure 3:
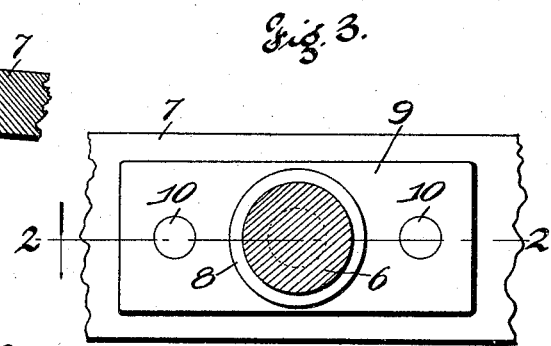

In the drawings, Figure 1 is a view in elevation of a vehicle-wheel embodying the principles of my invention. Fig. 2 is an enlarged sectional detail showing the connection between the spoke and the rim and taken on the line 2 2 of Fig. 3. Fig. 3 is a sectional detail through the spoke inside of the rim and looking outwardly, as indicated by the line 3 3 of Fig. 2.

Referring to the drawings in detail, the hub 5 and spokes 6 may be of any of the ordinary constructions. A solid metal rim 7 takes the place of the usual felly and tire. A spoke-socket 8 is slidingly mounted upon the outer end of each of the spokes, and a flange 9, formed integral with the socket 8, provides means of attaching a socket to the rim 7, said flange 9 being secured to the rim by rivets 10, the outer ends of said rivets being seated in long tapered bores 11 in the rim. A bearing-plate 12 is placed against the end of the spoke inside of the socket 8, and a set-screw 13 is tightly screw-seated through the rim 7 against the bearing-plate 12, so that by tightening said screws 13 the desired strain may be placed upon the rim 7, causing the wheel to dish, as required to make a strong substantial wheel. The rims 7 are made comparatively thick, and the bores 11 of the rivets are long and tapered, so that as the rims wear thin the heads of the rivets will still hold. By this construction I do away with the necessity of the usual fellies, thereby avoiding all danger of the tires coming loose and at the same time cheapening and simplifying the construction.

I call especial attention to the fact that I can put the desired strain upon the rim by tightening the set-screws at any time, so as to give the required dish to the wheel.

I claim—

1. In a vehicle-wheel: a hub; spokes extending outwardly from the hub; sockets slidingly mounted upon the outer ends of the spokes; flanges extending from the sockets; a rim encircling the flanges; rivets inserted through the rim and through the flanges; bearing-plates against the outer ends of the spokes inside of the rim; and set-screws screw-seated in the rim and engaging the bearing-plates to tighten the rim upon the spokes; substantially as specified.

2. In a vehicle-wheel: a hub; spokes extending outwardly from the hub; sockets slidingly mounted upon the outer ends of the spokes; a rim encircling the sockets and secured thereto; bearing-plates against the outer ends of the spokes inside of the rim; and set-screws screw-seated through the rim and engaging the bearing-plates to tighten the rim upon the spokes; substantially as specified.

3. In a vehicle-wheel: a hub; spokes extending outwardly from the hub; sockets slidingly mounted upon the outer ends of the spokes; flanges extending from the sockets; a rim encircling the flanges; rivets inserted through the rim and through the flanges; the outer ends of the rivets fitting in long tapered holes in the rim; bearing-plates against the outer ends of the spoke inside of the rim; and set-screws screw-seated in the rim and engaging the bearing-plates to tighten the rim upon the spokes; substantially as specified.

In testimony whereof I have signed my name to this specification in presence of two subscribing witnesses.

WILLIAM S. PLUMMER.

Witnesses:
CHAS. E. COE,
B. B. MOSS.